United States Patent [19]

Fry et al.

[11] Patent Number: 5,206,058
[45] Date of Patent: Apr. 27, 1993

[54] PROCESS FOR PAINTING POLYPROPYLENE

[75] Inventors: Slaton E. Fry; Allen J. Blankenship, both of Batesville; David W. Magouyrk, Locust Grove, all of Ark.; Paul J. Greene, Kingsport, Tenn.; Thomas W. Smith, Longview, Tex.

[73] Assignee: Eastman Kodak Company, Rochester, N.Y.

[21] Appl. No.: 840,975

[22] Filed: Feb. 26, 1992

[51] Int. Cl.⁵ .......................... B05D 1/38; B05D 5/04
[52] U.S. Cl. ................... 427/412.3; 427/322; 428/516; 428/520
[58] Field of Search ............. 427/412.3, 322; 428/516, 520

[56] References Cited

U.S. PATENT DOCUMENTS

| | | | |
|---|---|---|---|
| 3,632,393 | 1/1972 | Poppe et al. | 117/72 |
| 4,489,193 | 12/1984 | Goswami | 525/190 |
| 4,623,567 | 11/1986 | Hert | 428/36 |
| 4,640,865 | 2/1987 | Lancaster | 428/520 |
| 4,677,163 | 6/1987 | Tada et al. | 525/190 |
| 4,678,713 | 7/1987 | Lancaster et al. | 428/421 |
| 4,687,805 | 8/1987 | White | 524/569 |
| 4,880,908 | 11/1989 | Lutz et al. | 525/468 |
| 4,914,184 | 4/1990 | Rosenbrand et al. | 528/392 |
| 4,960,865 | 10/1990 | Blytas et al. | 528/499 |

FOREIGN PATENT DOCUMENTS 8607013 12/1986 PCT Int'l Appl. ................ 428/516

Primary Examiner—Shrive Beck
Assistant Examiner—Erma Cameron
Attorney, Agent, or Firm—Charles R. Martin; William P. Heath, Jr.

[57] ABSTRACT

Disclosed is a process comprising
(A) preparing an adhesion promoting coating by applying to a polypropylene substrate a chlorinated interpolymer of ethylene and carbon monoxide having an amount of carbon monoxide in the range of 2.5 to 6.8 weight percent and an amount of chlorine in the range of 19 to 26 weight percent, and
(B) coating the adhesion promoting coating with a paint.

1 Claim, No Drawings

PROCESS FOR PAINTING POLYPROPYLENE

This invention relates to a process for painting polypropylene wherein a polypropylene substrate is coated with a chlorinated interpolymer of ethylene and carbon monoxide and the paint is applied to the coating. The chlorinated interpolymer of carbon monoxide and ethylene functions as a primer coating and enhances the adhesion of the paint to the polyolefin substrate.

The application of paints and other coatings to substrates of polyolefin, such as polypropylene, thermoplastic olefin and polyethylene, is typically difficult because polyolefins are substantially chemically inert.

This problem has previously been overcome by use of two different approaches which employ adhesion promoting compositions. One approach is to use an adhesion promoting composition as a separate primer coating between the polyolefin substrate and the paint. The primer coating adheres adequately to both the polyolefin and the paint and thereby creates a unitary three component structure with the paint as the outer portion of the structure. Another approach to coating polyolefins has been to use an adhesion promoting composition as an additive along with the paint. This technique is sometimes known in the art as use of a "stir in" adhesion promoter.

Numerous polymeric materials have been investigated as possible components for such adhesion promoters. Chlorinated polyolefins have been found to be very satisfactory as the polymeric component for primer compositions due to their cost and performance. For example, U.S. Pat. No. 3,579,485, U.S. Pat. No. 4,070,421, U.S. Pat. No. 4,966,947, U.S. Pat. No. 4,962,149 and U.S. Pat. No. 4,954,573 disclose chlorinated polyolefins which are entirely satisfactory for the polymeric component of adhesion promoting compositions useful for coating polyolefin substrates.

We have now discovered that a particular type of polymer well known in the art can be used as a primer coating composition to enhance the adhesion of paints to polypropylene.

The polymer useful in this invention can be broadly described as an interpolymer of ethylene and carbon monoxide. These polymers and the method of their preparation are well known in the art and are disclosed in U.S. Pat. No. 4,616,072. The polymers useful in this invention are within the class of polymers disclosed in U.S. Pat. No. 4,616,072 but have particular ranges of carbon monoxide and chlorine. In this invention, the polymer has an amount of chlorine in the range of 19 to 26 weight percent, based on the weight of the polymer. The polymer has an amount of carbon monoxide in the range of 2.5 to 6.8 weight percent and an amount of ethylene in the range of 97.5 to 93.2 weight percent, based on the weight of the polymer. In an optional embodiment, the polymer can be reacted with maleic anhydride according to methods well known in the art, such as disclosed in U.S. Pat. No. 4,966,947.

In this invention the amount of chlorine is in the range of 19 to 26 weight percent, based on the weight of the polymer. The polymers useful in this invention containing this range of chlorine can be prepared by methods well known in the art.

The first step in the process of this invention comprises preparing an adhesion promoting coating by applying the polymer to a polypropylene substrate. In order to apply the polymer to the substrate the polymer is typically diluted with a suitable solvent. The organic solvents useful in this invention can be any organic solvent which will dissolve the polymer and has sufficient vapor pressure to allow the adhesion promoting coating to dry within a suitable length of time. Typical groups of compounds useful as the organic solvent are aromatic hydrocarbons, chlorinated hydrocarbons, alicyclic hydrocarbons and tetrahydrofuran. Preferably, the organic solvent is an aromatic hydrocarbon. Examples of suitable aromatic hydrocarbons include xylene, toluene, ethyl benzene and diisopropyl benzene. The most preferred organic solvents are toluene and xylene.

After the polymer has been diluted with an organic solvent the diluted polymer is used as an adhesion promoting primer coating by applying the diluted polymer, together with any additives desired, to the polypropylene substrate to form a coating. The coating can be applied using conventional means, such as spraying, brushing or dipping. The coating is then allowed to dry by the evaporation of the organic solvent.

After the coating has dried the second step of the process is conducted by applying a paint over the primer coating. The paint can be applied by conventional means such as spraying, brushing or dipping. The primer coating adheres to both the polypropylene and the paint and thereby creates a unitary three component structure with the paint as the outer portion of the structure.

The paint which can be applied can be any paint that will form a suitable surface and bond well to the primer coating. Examples of classes of paints that can be used include acrylics, lacquers, acrylic enamels, and two part urethanes. Preferred paints are acrylic, lacquers and acrylic enamels.

In the following examples the invention was practiced by preparing polymers within the scope of the invention, diluting the polymers with toluene, applying the diluted polymer to a polypropylene substrate to form a coating, allowing the diluted polymer to dry and the applying a paint to the dried primer coating.

The following is a specific example of how the invention can be practiced.

A 1000 mL glass, round bottom flask equipped with a mechanical stirrer, mercury thermometer, distillation/reflux head and a gas inlet tube is charged with 100.0 g of an ethylene/carbon monoxide copolymer within the scope of the invention and 300 grams of chlorobenzene. This mixture is heated to dissolve all of the polymer and the amount of chlorobenzene is adjusted to yield a relatively nonviscous solution in order to facilitate the addition of the chlorine. The reaction mass is then heated to 110° C.–120° C. and a chlorine addition rate of 10–20 g per hour is started. After the addition is complete, the excess chlorine is purged from the reaction mass by degassing with nitrogen. The solvent is then removed by vacuum distillation at 30 mm pressure to a pot temperature of 90° C. Xylene is added to the molten polymer to obtain a solution possessing approximately 25% weight solids. The xylene solution of the chlorinated ethylene/carbon monoxide copolymer is diluted to 5% solids with toluene. This dilute solution is primed onto a clean polypropylene substance, rectangular plate, by air spraying. After the solvent has totally evaporated, an acrylic enamel paint is applied by spraying. After the paint has dried the percentage adhesion is measured in accordance with ASTM D3359B.

The invention was practiced following the above type of procedure using numerous polymers within the scope of the invention having varying amounts of chlorine and carbon monoxide and the percentage adhesion measured. Results of this work is reported below.

We claim:

| Run | Percent CO | Percent Cl | Percent Adhesion |
|-----|------------|------------|------------------|
| 1 | 2.5 | 24 | 100 |
| 2 | 5.3 | 24 | 70 |
| 3 | 4.5 | 25 | 98 |
| 4 | 6.2 | 23 | 99 |

-continued

| Run | Percent CO | Percent Cl | Percent Adhesion |
|-----|------------|------------|------------------|
| 5 | 6.8 | 20 | 100 |
| 6 | 2.5 | 24 | 100 |

1. A process comprising
(A) preparing an adhesion promoting coating by applying to a polypropylene substrate a chlorinated interpolymer of ethylene and carbon monoxide having an amount of carbon monoxide in the range of 2.5 to 6.8 weight percent and an amount of chlorine in the range of 19 to 26 weight percent, and
(B) coating the adhesion promoting coating with a paint.

* * * * *